(12) United States Patent
Shofer

(10) Patent No.: US 6,793,547 B2
(45) Date of Patent: Sep. 21, 2004

(54) KAYAK PADDLE WITH SAFETY MIRROR

(76) Inventor: Richard Shofer, 216 Saint Dunstans Rd., Baltimore, MD (US) 21212

( * ) Notice: Subject to any disclaimer, the term of this patent is extended or adjusted under 35 U.S.C. 154(b) by 0 days.

(21) Appl. No.: 10/322,539

(22) Filed: Dec. 19, 2002

(65) Prior Publication Data

US 2004/0121669 A1 Jun. 24, 2004

(51) Int. Cl.[7] ............................................... B63H 16/06
(52) U.S. Cl. ....................................................... 440/101
(58) Field of Search ................................. 440/101, 102, 440/103, 104, 105, 106, 107, 108, 109, 110, 36; 416/69, 70 R, 74; 114/221 R, 347; 359/842; 248/476; D12/215

(56) References Cited

U.S. PATENT DOCUMENTS

| | | | | |
|---|---|---|---|---|
| 1,311,253 A | * | 7/1919 | Stern | 356/21 |
| 4,319,851 A | * | 3/1982 | Arthur | 401/137 |
| 4,331,382 A | * | 5/1982 | Graff | 359/868 |
| 4,603,944 A | * | 8/1986 | Greenlaw et al. | 359/818 |
| 4,643,544 A | * | 2/1987 | Loughran | 359/854 |
| 4,701,142 A | * | 10/1987 | Merritt | 440/101 |
| 4,826,306 A | * | 5/1989 | Grissen et al. | 359/842 |
| 5,165,081 A | * | 11/1992 | Drumheller | 359/854 |
| 6,328,617 B1 | * | 12/2001 | Gunnell | 440/101 |

FOREIGN PATENT DOCUMENTS

| | | | | |
|---|---|---|---|---|
| DE | | 4330450 A1 | * 3/1995 | ........... B63H/16/00 |

OTHER PUBLICATIONS

Adirondack Rowing, "Parts List", http://www.adirondack-rowing.com/Parts.html, pp 1–2, and "Rowing Mirror", http://www.adirondackrowing.com/rowing_mirrors.htm, pp 1–2, date of Jun. 3, 2002 established by "Internet Archive" at http://www.archive.org/.*

* cited by examiner

Primary Examiner—Andrew Wright
(74) Attorney, Agent, or Firm—Lawrence E. Laubscher, Sr.

(57) ABSTRACT

A kayak paddle includes a safety mirror that is mounted on a central portion of the shaft relative to the paddle blades, whereby the user may manually position the paddle to view the area behind the user without repositioning the kayak. The safety mirror includes a frame having front and rear surfaces, and a reflective body mounted on the frame front surface. The rear surface of the mirror frame is connected with the central shaft portion by a connecting device, such as a clamping device including a pair of resilient arms, a Velcro strap arrangement, a layer of adhesive, or a screw-operated pipe clamp.

7 Claims, 1 Drawing Sheet

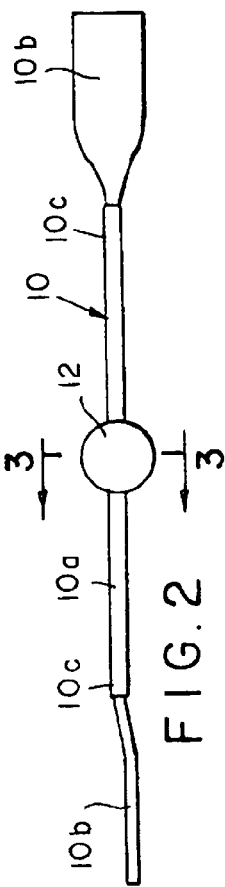
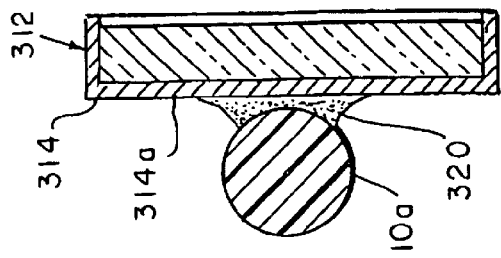
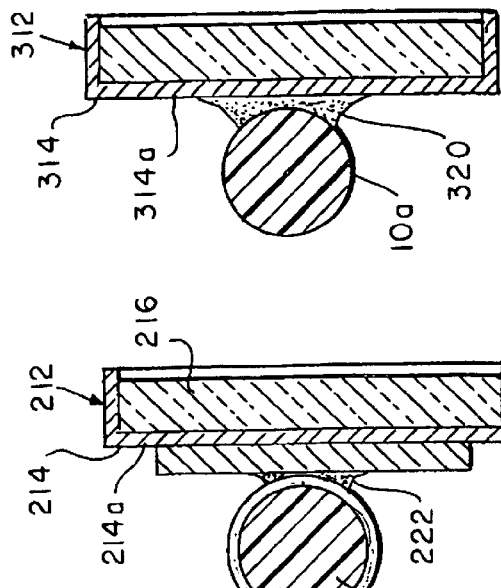
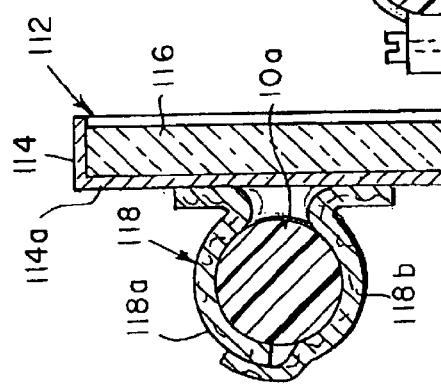
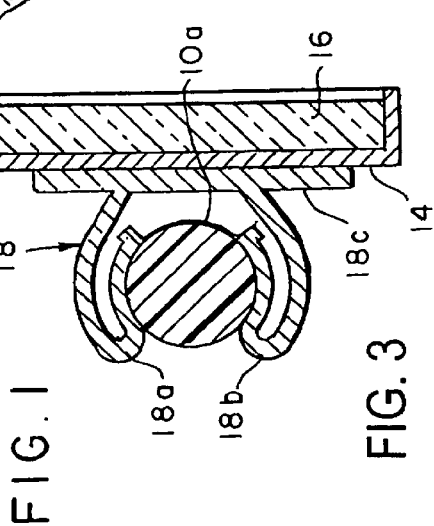
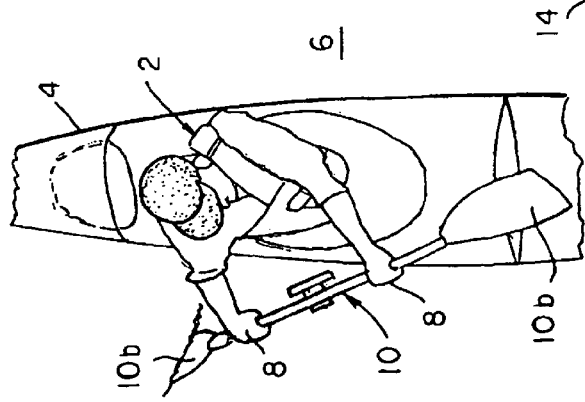

KAYAK PADDLE WITH SAFETY MIRROR

BACKGROUND OF THE INVENTION

1. Field of the Invention

A kayak paddle includes safety mirror means mounted on the central portion f the kayak shaft, thereby to permit a user to view the rear area behind the kayak without any repositioning of the kayak. The safety mirror includes a frame and a reflective body, and the frame is connected with the shaft by mirror mounting means of the resilient clamping arm type, a Velcro strap fastening arrangement, an adhesive bonding means, a screw-operated pipe clamping device, or the like.

2. Brief Description of the Prior Art

It is well known in the patented prior art to provide rear view mirrors on an device so that a user can view the scenery behind him or her. For example, in the Grissen, et al., U.S. Pat. No. 4,826,306, a rear view mirror is mounted on the handlebar of a bicycle, and vehicular mirrors are disclosed in the patents to Schmidt, et al.,U.S. No. 5,301,916 and Stem U.S. Pat. No. 1,311,253. In the Deal U.S. Pat. No. 5,361,169, a mirror is disclosed that can be attached to an underwater diver's wrist or arm so that the diver can see objects, fish, or a diving partner located behind him or her.

It is also known in the sport of recreational kayaking to provide kayak paddles having various blade designs and configurations, degrees of blade feather, and shaft designs. These paddles may be formed of wood, a light weight metal or alloy, or a suitable synthetic plastic material, such as a carbon-fiberglass material. Quite often the paddles are sectional, and include two-piece and four-piece models that can be disassembled and stored like luggage. The cost of such paddles normally runs from bout $ 140 for a wood laminate paddle to well over $ 355 for a 21-ounce paddle formed from space-age materials.

A major problem in kayaking is that the user must normally turn the kayak to some extent in order to view the area behind the user, which turning is difficult and time consuming, and also very dangerous in white water kayaking conditions. Also, a busy kayak user must generally keep both hands on the kayak paddle for control of the craft, which is quite tipsy in the water.

A kayak is a water craft normally in continuous motion when in use, as are bicycles and motor vehicles. Nonetheless, there is a major difference with water craft, and particularly a kayak, that sets it very much apart from other transportation devices.

The surface on which a bicycle moves or an automobile rides is stationary. Nothing is stationary about water. A kayak is moving continually sideways, up and down and in constantly changing directions as well as forward. A bicycle or automobile moves in a single dimension which is straight forward. A kayak moves in all three different dimensions constantly. Waves, currents, wind, wakes from the other craft, tides, imperfect paddling strokes and the rocking, from side to side, of the kayak itself, are seven of the many separate forces always resulting in three dimensional movement.

It is true that a person can get a clear rear view picture by looking through the rear view mirror of an automobile or bicycle moving in only one direction—straight forward. However, a mirror affixed to a kayak or even any object connected or affixed to a kayak will be worthless and not finctional. A mirror must remain in stationary directional alignment with the human eye in order for the human eye to focus on a particular object being viewed behind the water craft. The three dimensional movement of a kayak further interplaying with the separate simultaneous movement of a persons body as they continually shift balance and paddle prevents focusing between the human eye, a mirror fixed to a kayak and an object in a rear view. Accordingly, a mirror affixed to any moving vehicle, or any object directly attached to a moving vehicle, will not meet the required needs of a person operating a kayak or other similar type water craft.

The present invention was developed to solve the need for displaying to a kayaker the view behind the user without varying the orientation of the kayak.

SUMMARY OF THE INVENTION

Accordingly, a primary object of the present invention is to provide a kayak paddle having a safety mirror mounted centrally on the paddle shaft between the two handgrip portions adjacent the paddle blades, respectively. In this manner, in order to view the area behind the kayak, the kayaker need only to raise the paddle by lifting both hands, and to orient the paddle and the mirror to view the desired object. Upon completion of the viewing, the kayaker simply lowers his or her hands to lower the paddle and to return the kayak blades into the water. Thus, in accordance with the primary object of the invention, this rear viewing procedure may be achieved in an expedited manner without any variation of the orientation of the tipsy kayak.

In accordance with a more specific object of the invention, mirror mounting means are provided for mounting the safety mirror on the kayak paddle centrally between the two handgrip portions adjacent the paddle blades, respectively. In one case, the mirror is removably connected with the paddle shaft, thereby to permit complete disassembly and storage of a sectional kayak paddle. Alternatively, the mirror can be permanently attached to the shaft portion of the paddle, as, for example, by the use of a permanent adhesive.

Good balance in a kayak in motion is an absolute necessity. A kayak paddle doubles as a balancing aid to a kayaker, much like a pole to a tightrope walker. An attached mirror allows the kayaker to maintain balance in his prescribed "paddler's box" when viewing through a mirror attached to the center of the paddle. On the other hand, wearing a wrist mirror attachment and maintaining proper balance, would be measurably more difficult. Keeping balance is easier when the mirror is attached to the paddle shaft instead of the user's wrist, arm, or head.

According to the further object of the invention, a mirror having fastening mechanism attached to it is provided that will allow the user to attach the device to a kayak or canoe paddle. By this means, the user can quickly position the paddle that is holding the mirrored device into an versatile position in front of the user, thereby giving the user an immediate panoramic view in back of the user. There are specific advantages to having a mirror attached to a water craft paddle and particularly a kayak paddle. These advantages also pertain to canoes and other classification of water craft.

A kayak is a slender shaped water craft that is by nature "tippy." The user (or more than one user in the case of a tandem) sits erect, facing forward and with their legs and feet more or less extended in front of them. A person must apply balance continually while in a kayak. A persons body movement is restricted. When sitting in a kayak, a user cannot normally twist or turn sufficiently to readily see everything in their rear.

Presently, a person sitting in a kayak, especially in motion, must necessarily change the direction that the kayak is pointing in order to see behind them. This generally involves slowing or stopping the kayak as well. Both time and physical effort, as well as intended kayak course, are relinquished in any effort to achieve a rear view at any time during a kayak trip.

A kayak paddle, when held properly by a user, besides driving the kayak, also serves to provide an additional measure of balance and stability to that user much the same as a "tightrope walker" uses a pole to facilitate balance. Paddlers in kayaks are taught to maintain a position known as a "paddlers box." This is, in fact, a customary prescription for proper paddling. A person in a kayak would likely find it difficult and cumbersome to hold a mirror in one hand and a paddle in the other hand, trying to balance themselves awkwardly, while looking through a hand held mirror for a rear view, especially in a tippy craft often rocking in waves.

The proposed paddle mirror safety device can be affixed to a paddle in just secondsfor any temporary need to have a rear field of view. The paddler using the device can maintain balance with both hands on the paddle. Should the user desire, the mirrored device can be removed in a few seconds as easily as it was attached to the paddle.

Numerous means can facilitate affixing the mirror short term to the paddle shaft. A clamp will do satisfactorily as will a band or even a hook and loop fastener arrangement such as VELCRO.

The attached safety mirror device will provide an increased measure of safety by allowing the user to look at other water craft and water wave conditions behind the kayak. This proposed device will allow the user to maintain visual contact with other craft that may be part of the user's kayaking group. It will also provide an additional measure of comfort to those persons in the rear also because they will know they are being seen (as opposed to being unseen). Once attached, this device will allow the paddler to maintain their proper "paddlers box" and therefore maintain better balance while still gaining access to a rear view. This device will allow a paddler to maintain course and speed while still gaining the benefit of a rear view. No stopping or turning of the craft is required in order to gain a rear view.

BRIEF DESCRIPTION OF THE DRAWINGS

Other object and advantages of the invention will become apparent from a study of the following specification when viewed in the light of the accompanying drawings, in which:

FIG. 1 is a top partial view illustrating the use of the invention by a kayaker;

FIG. 2 is a plan view of a 90° feathered kayak paddle provided with the safety mirror of the present invention;

FIG. 3 is a sectional view taken along line 3—3 of FIG. 2; and

FIGS. 4–6 are sectional views of alternative mirror mounting means according to the present invention.

DETAILED DESCRIPTION

Referring first more particularly to FIG. 1, the kayaker 2 is seated in a kayak 4 that is supported by the water 6. The kayaker grips with both hands 8 the kayak paddle 10. More particularly, the kayak paddle includes a shaft portion 10a having at its opposite ends a pair of blade portions 10b, as best shown in FIG. 2. In the illustrated embodiment, the blade portions 10b are feathered at an angle of 90°, although other blade angles are within the scope of the present invention. The hand grip portions 10c that are gripped by the kayaker's hands 8 are adjacent the paddle blades 10b, respectively.

In accordance with a characterizing feature of the present invention, a mirror 12 is mounted on the shaft portion 10a of the paddle 10 in a generally centrally arranged location between the hand grip portions 10c. As shown in FIG. 3, the mirror 12 includes a mirror frame 14 having a chamber that receives the circular disk-shaped reflective mirror body 16. Mounting means 18 are provided for mounting the mirror onto the central portion of the paddle shaft 10a. In the embodiment of FIG. 3, the mounting means 18 comprises a pair of opposed resilient arms 18a and 15b that are bent from a resilient metal strip 18c that is permanently fastened to the rear surface 14a of the frame 14 by suitable fastening means, such as a rivet, soldering, welding, and adhesive layer, or the like. Thus, to mount the mirror 12 onto the paddle shaft portion 10a, the mirror 12 is displaced toward the paddle shaft to cause the resilient arms 18a and 18b to expand outwardly during introduction of the shaft therebetween, whereupon the resilient arms are snapped into position against the outer peripheral surface of the paddle shaft portion 10a, as best shown in FIG. 3.

Referring now more particularly to FIG. 4, it will be seen that the mounting mean 118 for mounting the mirror 112 on the paddle shaft portion 10a comprises a pair of VELCRO straps 118a and 118b that are fastened to the rear surface 114a of the mirror frame 114. Upon releasing of the straps 118a and 118b, the mirror may be readily removed from the shaft portion 10a of the kayak paddle 10.

Referring to the embodiment of FIG. 5, the mirror 212 having a frame 214 is mounted on the shaft portion 10a of the kayak paddle by means of a screw-operated pipe clamping device 220 which is secured by weld means or solder 222, or the like, to the rear surface 214a of the frame 214 of the mirror 212.

Referring now to the embodiment of FIG. 6, the mirror 312 is permanently secured to the shaft portion 10a of the kayak paddle 10 by means of a mass of adhesive bonding material 320 that is bonded to the rear surface 314a of the frame 314.

The kayak paddle 10 is preferably formed from a synthetic carbon-glass fiber material, although it could well be formed from a wood laminate or a suitable lightweight alloy, such as an aluminum alloy. The blade portions 10b are illustrated as having a 90° feather, but the invention is also applicable to kayak blades that are unfeathered, or have other feather angles, such as 45° or 60°. The blade portion 10b could be any common kayak blade style, such as a square end style, a Aleul style, an asymmetrical style, an elliptical style, a symmetrical touring style, an asymmetric touring style, or a quill style. Although the kayak blade 10 has been illustrated as having a straight shaft, the invention could also apply to a kayak paddle having an ergonomical shaft configuration. Moreover, the kayak paddle could be formed in sections, such as two, three, or four sections that are removable connected together. In this regard, the disassembled blade components may be stored in baggaged form for transport and/or storage.

While in accordance with the provisions of the Patent Statutes the preferred forms and embodiments of the invention have been illustrated and described, it will be apparent to those skilled in the art that various changes and modifications may be made without deviating from the inventive concepts set forth above.

What is claimed is:

1. A kayak paddle and safety mirror assembly, comprising:
  (a) a kayak paddle including:
    (1) a shaft having a pair of end portions;
    (2) a pair of blades concreted with said shaft end portions, respectively, said shaft having a pair of spaced hand grip portions on said shaft end portions adjacent said blades, respectively;
  (b) a mirror, and
  (c) mirror mounting means for mounting said mirror on a central portion of said shaft generally equally between said hand grip portions; thereby to permit a user to raise and position the paddle to view in the mirror the area behind the user.

2. A kayak paddle as defined in claim 1, wherein said error includes a frame having front and rear surfaces, and a reflective body mounted adjacent said frame font surface.

3. A kayak paddle as defined in claim 2, wherein said mirror mounting means includes a pair of spaced resilient clamping arms extending rearwardly from said mirror frame rear surface for receiving in clamped relation therebetween said kayak paddle shaft central position.

4. A kayak paddle as defined in claim 3, wherein said clamping arms are bent from a unitary resilient metal strip that is secured to said mirror frame rear surface.

5. A kayak paddle as defined in claim 2, wherein said mirror means comprises hook and loop fastener means secured to said frame rear surface.

6. A kayak paddle defined in claim 2, wherein said mirror mounting means comprises a layer of adhesive material bonding said fame rear surface to said shaft central portion.

7. A kayak paddle as defined in claim 2, wherein said mirror mounting means comprises screw-op,rated pipe clamping mean secured to said frame rear surface.

* * * * *